(12) United States Patent
Ong et al.

(10) Patent No.: US 7,381,781 B2
(45) Date of Patent: Jun. 3, 2008

(54) PROCESS FOR THE PREPARATION OF LOW MOLECULAR WEIGHT HYDROGENATED NITRILE RUBBER

(75) Inventors: Christopher M. Ong, London (CA); Sharon X. Guo, Stratford (CA); Frederic Guerin, Petrolia (CA)

(73) Assignee: Lanxess Inc., Sarnia, Ontario (CA)

( * ) Notice: Subject to any disclaimer, the term of this patent is extended or adjusted under 35 U.S.C. 154(b) by 419 days.

(21) Appl. No.: 10/728,029

(22) Filed: Dec. 4, 2003

(65) Prior Publication Data

US 2004/0132891 A1    Jul. 8, 2004

(30) Foreign Application Priority Data

Dec. 5, 2002  (CA) .................................. 2413607

(51) Int. Cl.
*C08L 9/02*        (2006.01)
(52) U.S. Cl. ............... 526/171; 525/329.1; 525/329.2; 525/329.3; 525/343; 526/341
(58) Field of Classification Search ............... 526/171, 526/341; 525/329.1, 329.2, 329.3, 343
See application file for complete search history.

(56) References Cited

U.S. PATENT DOCUMENTS

| 5,446,102 A | 8/1995 | Oziomek et al. ............ 525/245 |
| 6,187,867 B1 * | 2/2001 | Rau et al. .................... 525/221 |
| 6,780,939 B2 * | 8/2004 | Guerin et al. ............. 525/329.1 |
| 2002/0111432 A1 | 8/2002 | Obrecht et al. ............. 525/192 |

FOREIGN PATENT DOCUMENTS

| EP | 1 152 029 | 11/2001 |
| WO | 02/100905 | 12/2002 |
| WO | 02/100941 | 12/2002 |
| WO | 03/002613 | 1/2003 |

OTHER PUBLICATIONS

Journal of Molecular Catalysis, vol. 46, 1988, pp. 433-444, XP0008028060.

* cited by examiner

*Primary Examiner*—Robert D. Harlan
(74) *Attorney, Agent, or Firm*—Jennifer R. Seng

(57) ABSTRACT

The present invention relates to a process for the production of hydrogenated nitrile rubber polymers having lower molecular weights and narrower molecular weight distributions than those known in the art in the absence of a co-(olefin).

17 Claims, No Drawings

PROCESS FOR THE PREPARATION OF LOW MOLECULAR WEIGHT HYDROGENATED NITRILE RUBBER

FIELD OF THE INVENTION

The present invention relates to a process for the production of hydrogenated nitrile rubber polymers having lower molecular weights and narrower molecular weight distributions than those known in the art in the absence of a co-(olefin).

The present invention also relates to polymer composites containing at least one, optionally hydrogenated, nitrile rubber polymer having a Mooney viscosity (ML 1+4 @ 100° C.) in the range of from 50-30, at least one filler and optionally at least one cross-linking agent.

BACKGROUND OF THE INVENTION

Hydrogenated nitrile rubber (HNBR), prepared by the selective hydrogenation of acrylonitrile-butadiene rubber (nitrile rubber; NBR, a co-polymer containing at least one conjugated diene, at least one unsaturated nitrile and optionally further comonomers), is a specialty rubber which has very good heat resistance, excellent ozone and chemical resistance, and excellent oil resistance. Coupled with the high level of mechanical properties of the rubber (high resistance to abrasion) it is not surprising that HNBR has found widespread use in the automotive (seals, hoses, bearing pads) oil (stators, well head seals, valve plates), electrical (cable sheathing), mechanical engineering (wheels, rollers) and shipbuilding (pipe seals, couplings) industries, amongst others.

Commercially available HNBR has a Mooney viscosity in the range of from 55 to 105, a molecular weight in the range of from 200,000 to 500,000 g/mol, a polydispersity greater than 3.0 and a residual double bond (RDB) content in the range of from 1 to 18% (by IR spectroscopy).

One limitation in processing HNBR is the relatively high Mooney Viscosity. In principle, HNBR having a lower molecular weight and lower Mooney viscosity would have better processability. Attempts have been made to reduce the molecular weight of the polymer by mastication (mechanical breakdown) and by chemical means (for example, using strong acid), but such methods have the disadvantages that they result in the introduction of functional groups (such as carboxylic acid and ester groups) into the polymer, and the altering of the microstructure of the polymer. This results in disadvantageous changes in the properties of the polymer. In addition, these types of approaches, by their very nature, produce polymers having a broad molecular weight distribution.

A hydrogenated nitrile rubber having a low Mooney (<55) and improved processability, but which has the same microstructure as those rubbers which are currently available, is difficult to manufacture using current technologies. The hydrogenation of NBR to produce HNBR results in an increase in the Mooney viscosity of the raw polymer. This Mooney Increase Ratio (MIR) is generally around 2, depending upon the polymer grade, hydrogenation level and nature of the feedstock. Furthermore, limitations associated with the production of NBR itself dictate the low viscosity range for the HNBR feedstock. Currently, one of the lowest Mooney viscosity products available is Therban® VP KA 8837 (available from Bayer), which has a Mooney viscosity of 55 (ML 1+4 @ 100° C.) and a RDB of 18%.

Co-pending applications PCT/CA02/00967, PCT/CA02/00966 and PCT/CA02/00965 disclose a process for the preparation of a, optionally hydrogenated, nitrile rubber including reacting a nitrile rubber in the presence of at least one co-olefin. The present invention discloses a process for the preparation of a, optionally hydrogenated, nitrile rubber including reacting a nitrile rubber in the absence of a co-olefin.

SUMMARY OF THE INVENTION

It has now been discovered that, optionally hydrogenated, nitrile rubber having lower molecular weights and narrower molecular weight distributions than those known in the art can be prepared by the metathesis of nitrile butadiene rubber in the absence of a co-(olefin), followed by hydrogenation of the resulting metathesized NBR. The inventive process is capable of producing a, optionally hydrogenated, nitrile rubber having a molecular weight ($M_w$) in the range of from 20,000 to 250,000, a Mooney viscosity (ML 1+4 @ 100 deg. C.) of in the range of from 1 to 50, and a MWD (or polydispersity index) of less than 2.6.

The present invention relates to a polymer composite containing at least one, optionally hydrogenated, nitrile rubber polymer ("NBR" or "HNBR" if hydrogenated) having a Mooney viscosity (ML 1+4 @ 100° C.) in the range of from 50-30 and a residual double bond (RDB) content in the range of from 1 to 18% (by IR spectroscopy), at least one filler and optionally at least one cross-linking agent. The NBR can be fully or partially hydrogenated ("HNBR"). The present invention also relates to polymer composites containing at least one, optionally hydrogenated, nitrile rubber polymer having a Mooney viscosity (ML 1+4 @ 100° C.) in the range of 50-30, preferably below 50, more preferably below 45.

DESCRIPTION OF THE INVENTION

As used throughout this specification, the term "nitrile polymer" is intended to have a broad meaning and is meant to encompass a copolymer having repeating units derived from at least one conjugated diene, at least one alpha-beta-unsaturated nitrile and optionally further one or more copolymerizable monomers.

The conjugated diene may be any known conjugated diene, such as a $C_4$-$C_6$ conjugated diene. Preferred conjugated dienes include butadiene, isoprene, piperylene, 2,3-dimethyl butadiene and mixtures thereof. More preferred $C_4$-$C_6$ conjugated dienes include butadiene, isoprene and mixtures thereof. The most preferred $C_4$-$C_6$ conjugated diene is butadiene.

The unsaturated alpha-beta-unsaturated nitrile may be any known alpha-beta-unsaturated nitrile, such as a $C_3$-$C_5$ alpha-beta-unsaturated nitrile. Preferred $C_3$-$C_5$ alpha-beta-unsaturated nitrites include acrylonitrile, methacrylonitrile, ethacrylonitrile and mixtures thereof. The most preferred $C_3$-$C_5$ alpha-beta-unsaturated nitrile is acrylonitrile.

Preferably, the copolymer contains in the range of from 40 to 85 weight percent of repeating units derived from one or more conjugated dienes and in the range of from 15 to 60 weight percent of repeating units derived from one or more unsaturated nitriles. More preferably, the copolymer contains in the range of from 60 to 75 weight percent of repeating units derived from one or more conjugated dienes and in the range of from 25 to 40 weight percent of repeating units derived from one or more unsaturated nitriles. Most preferably, the copolymer contains in the range of from 60 to 70 weight percent of repeating units derived from one or more conjugated dienes and in the range of from 30 to 40 weight percent of repeating units derived from one or more unsaturated nitriles.

Optionally, the copolymer may further contain repeating units derived from one or more copolymerizable monomers, such as unsaturated carboxylic acids. Non-limiting examples of suitable unsaturated carboxylic acids include fumaric acid, maleic acid, acrylic acid, methacrylic acid and mixtures thereof. Repeating units derived from one or more copolymerizable monomers can replace either the nitrile or the diene portion of the nitrile rubber and it will be apparent to the skilled in the art that the above mentioned figures will have to be adjusted to result in 100 weight percent. In case of the mentioned unsaturated carboxylic acids, the nitrile rubber preferably contains repeating units derived from one or more unsaturated carboxylic acids in the range of from 1 to 10 weight percent of the rubber, with this amount displacing a corresponding amount of the conjugated diolefin. The presence of these comonomers seems to enhance the metathesis reaction and allows the reaction to be conducted at temperatures in the range of from 0-50° C.

Other preferred optionally further monomers include unsaturated mono- or di-carboxylic acids or derivatives thereof (e.g., esters, amides and the like) including mixtures thereof.

According to the present invention the substrate is first subject to a metathesis reaction and then optionally hydrogenated if the preferred HNBR is desired.

Metathesis

The metathesis reaction is conducted in the presence of one or more compounds of the general formulas I, II, III or IV,

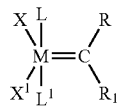

Formula I wherein
M is Os or Ru,
R and $R^1$ are, independently, hydrogen or a hydrocarbon selected from the group consisting of $C_2$-$C_{20}$ alkenyl, $C_2$-$C_{20}$ alkynyl, $C_1$-$C_{20}$ alkyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl and $C_1$-$C_{20}$ alkylsulfinyl,
X and $X^1$ are independently any anionic ligand,
L and $L^1$ are independently any neutral ligand, such as phosphines, amines, thioethers, imidazolidinylidenes or imidazolidines or any neutral carbine, optionally, L and $L^1$ can be linked to one another to from a bidentate neutral ligand;

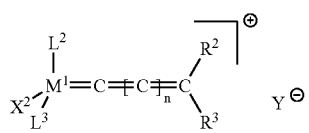

Formula II wherein
$M^1$ is Os or Ru,
$R^2$ and $R^3$ are, independently, hydrogen or a hydrocarbon selected from the group consisting of $C_2$-$C_{20}$ alkenyl, $C_2$-$C_{20}$ alkynyl, $C_1$-$C_{20}$ alkyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl and $C_1$-$C_{20}$ alkylsulfinyl,
$X^2$ is an anionic ligand,
$L^2$ is a neutral □-bonded ligand, preferably but not limited to arene, substituted arene, heteroarene, independent of whether they are mono- or polycyclic,
$L^3$ is a ligand selected from the group consisting of phosphines, sulfonated phosphines, fluorinated phosphines, functionalized phosphines bearing up to three aminoalkyl-, ammoniumalkyl-, alkoxyalkyl-, alkoxylcarbonylalkyl-, hydroxycarbonylalkyl-, hydroxyalkyl- or ketoalkyl-groups, phosphites, phosphinites, phosphonites, phosphinamines, arsines, stibenes, ethers, amines, amides, imines, sulfoxides, thioethers and pyridines;
$Y^-$ is a non-coordinating anion,
n is an integer in the range of from 0 to 5;

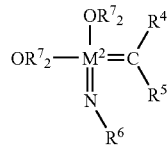

Formula III wherein
$M^2$ is Mo or W,
$R^4$, $R^5$ are, independently, hydrogen or a hydrocarbon selected from the group consisting of $C_2$-$C_{20}$ alkenyl, $C_2$-$C_{20}$ alkynyl, $C_1$-$C_{20}$ alkyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl and $C_1$-$C_{20}$ alkylsulfinyl,
$R^6$ and $R^7$ are independently selected from any unsubstituted or halo-substituted alkyl, aryl, aralkyl groups or silicon-containing analogs thereof;

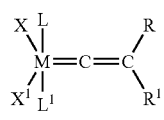

Formula IV wherein
M is Os or Ru,
R and $R^1$ are independently selected from the group consisting of hydrogen, substituted or unsubstituted alkyl, and substituted or unsubstituted alkyl,
X and $X^1$ are independently any anionic ligand, and
L and $L^1$ are independently any neutral ligand, such as phosphines, amines, thioethers, imidazolidinylidenes or imidazolidines or any neutral carbine, optionally, L and $L^1$ can be linked to one another to from a bidentate neutral ligand.

Compounds of Formula I are preferred. Compounds of Formula I wherein L and $L^1$ are independently selected from the group consisting of trialkylphosphines, imidazolidinylidenes or imidazolidines X and $X^1$ are chloride ions and M is Ruthenium are more preferred. Another group of preferred compounds include compounds known as $2^{nd}$ generation Grubb's catalysts, such as 1,3-bis-(2,4,6-trimethylphenyl)-2-imidazolidinylidene)-(tricyclohexylphosphine) ruthenium(phenylmethylene) dichloride.

The amount of compounds will depend upon the nature and catalytic activity of the compound(s) in question. Typically, the ratio of compound(s) to NBR is in the range of from 0.005 to 5, preferably in the range of from 0.025 to 1 and, more preferably, in the range of from 0.1 to 0.5.

The metathesis reaction is carried out in the absence of any co-olefin.

The metathesis reaction can be carried out in any suitable solvent which does not inactivate the catalyst or otherwise interfere with the reaction. Preferred solvents include, but are not limited to, dichloromethane, benzene, toluene, tetrahydrofuran, methyl ethyl ketone, cylcohexane and the like. The preferred solvent is monochlorobenzene (MCB). In certain cases the co-olefin can itself act as a solvent (for example, 1-hexene), in which case no other solvent is necessary.

The concentration of NBR in the reaction mixture is not critical but, obviously, should be such that the reaction is not hampered if the mixture is too viscous to be stirred efficiently, for example. Preferably, the concentration of NBR is in the range of from 1 to 40% by weight, more preferably in the range of from 6 to 15 wt. %.

The metathesis reaction is preferably carried out at a temperature in the range of from 0 to 140° C.; in the absence of any co-monomers preferably in the range of from 20 to 100° C.

The reaction time will depend upon a number of factors, including cement concentration, amount of catalyst used and the temperature at which the reaction is performed. The metathesis is usually complete within the first two hours under typical conditions. The progress of the metathesis reaction may be monitored by standard analytical techniques, for example using GPC or solution viscosity. Whenever referenced throughout the specification the molecular weight distribution of the polymer was determined by gel permeation chromatography (GPC) using a Waters 2690 Separation Module and a Waters 410 Differential Refractometer running Waters Millenium software version 3.05.01. Samples were dissolved in tetrahydrofuran (THF) stabilized with 0.025% BHT. The columns used for the determination were three sequential mixed-B gel columns from Polymer Labs. Reference Standards used were polystyrene standards from American Polymer Standards Corp.

The present invention includes hydrogenated nitrile rubbers. One way of obtaining those from the corresponding NBR is hydrogenation.

Hydrogenation

Reduction of the product from the metathesis reaction can be effected using standard reduction techniques known in the art. For example, homogeneous hydrogenation catalysts known to those of skill in the art, such as Wilkinson's catalyst $\{(PPh_3)_3RhCl\}$ and the like can be used.

Processes for the hydrogenation of NBR are known and may also be used for the production of the hydrogenation products according to the invention. Rhodium or titanium is generally used as the catalyst, although platinum, iridium, palladium, rhenium, ruthenium, osmium, cobalt or copper in the form of the metals, but preferably in the form of metal compounds, may also be used, see for example U.S. Pat. No. 3,700,637; DE-PS 2,539,132; EP-A-134 023; DE-OS 35 41 689; DE-OS 35 40 918; EP-A 298 386; DE-OS 35 29 252; DE-OS 34 33 392; U.S. Pat. No. 4,464,515; and U.S. Pat. No. 4,503,196.

Suitable catalysts and solvents for hydrogenation in homogeneous phase are described in the following, and in GB 1558491 of Bayer AG and in EP 471,250, previously incorporated herein by reference. It is not intended to restrict the catalysts and solvents for hydrogenation useful for the invention, and these are provided only by way of example.

The selective hydrogenation can be achieved by means of a rhodium-containing catalyst. The preferred catalyst includes of the formula

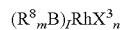

$(R^8{}_mB)_lRhX^3{}_n$ in which each $R^8$ is a $C_1$-$C_8$-alkyl group, a $C_4$-$C_8$-cycloalkyl group a $C_6$-$C_{15}$-aryl group or a $C_7$-$C_{15}$-aralkyl group, B is phosphorus, arsenic, sulfur, or a sulphoxide group S=O, $X^3$ is hydrogen or an anion, preferably a halide and more preferably a chloride or bromide ion, l is 2, 3 or 4, m is 2 or 3 and n is 1, 2 or 3, preferably 1 or 3. Preferred catalysts include tris-(triphenylphosphine)-rhodium(I)-chloride, tris (triphenylphosphine)-rhodium(III)-chloride and tris-(dimethylsulphoxide)-rhodium(III)-chloride, and tetrakis-(triphenylphosphine)-rhodium hydride of formula $((C_6H_5)_3P)_4$RhH, and the corresponding compounds in which triphenylphosphine moieties are replaced by tricyclohexyl-phosphine moieties. The catalyst can be used in small quantities. An amount in the range of 0.01 to 1.0% preferably 0.03% to 0.5%, more preferably 0.1% to 0.3% by weight based on the weight of polymer is suitable.

It is known to use the catalyst with a co-catalyst that is a ligand of formula $R^8{}_mB$, where R, m and B are as defined above, and m is preferably 3. Preferably B is phosphorus, and the R groups can be the same or different. Thus there can be used a triaryl, trialkyl, tricycloalkyl, diary monoalkyl, dialkyl monoaryl diaryl monocycloalkyl, dialkyl monocycloalkyl, dicycloalkyl monoaryl or dicycloalkyl monoaryl co-catalysts. Examples of co-catalyst ligands are given in U.S. Pat. No. 4,631,315, the disclosure of which is incorporated by reference. The preferred co-catalyst ligand is triphenylphosphine. The co-catalyst ligand is preferably used in an amount in the range 0.3 to 5%, more preferably 0.5 to 4% by weight, based on the weight of the copolymer. Preferably also the weight ratio of the rhodium-containing catalyst compound to co-catalyst is in the range 1:3 to 1:55, more preferably in the range 1:5 to 1:45. The weight of the co-catalyst, based on the weight of one hundred parts of rubber, can be in the range 0.1 to 33, or in the range of 0.5 to 20 and preferably 1 to 5, more preferably greater than 2 to less than 5.

The hydrogenation may be advantageously performed in situ i.e. in the same reaction vessel in which the metathesis step is carried out, without the need to first isolate the metathesized product. The hydrogenation catalyst is simply added to the vessel, which is then treated with hydrogen to produce the HNBR.

Hydrogenation in the present invention is understood by preferably more than 50% of the residual double bonds (RDB) present in the starting nitrile polymer being hydrogenated, preferably more than 90% of the RDB are hydrogenated, more preferably more than 95% of the RDB are hydrogenated and most preferably more than 99% of the RDB are hydrogenated.

The low Mooney HNBR according to the present invention can be characterized by standard techniques known in the art. For example, the molecular weight distribution of the polymer was determined by gel permeation chromatography (GPC) using a Waters 2690 Separation Module and a Waters 410 Differential Refractometer running Waters Millenium software version 3.05.01. Samples were dissolved in tetrahydrofuran (THF) stabilized with 0.025% BHT. The columns used for the determination were three sequential mixed-B gel columns from Polymer Labs. Reference Standards used were polystyrene standards from American Polymer Standards Corp.

The Mooney viscosity of the rubber was determined using ASTM test D1646.

The present inventive polymer composite can further contain at least one filler. The filler may be an active, inactive or a mixture thereof. The filler may be:

- highly dispersed silicas, prepared e.g. by the precipitation of silicate solutions or the flame hydrolysis of silicon halides, with specific surface areas of in the range of from 5 to 1000 m$^2$/g, and with primary particle sizes of in the range of from 10 to 400 nm; the silicas can optionally also be present as mixed oxides with other metal oxides such as those of Al, Mg, Ca, Ba, Zn, Zr and Ti;
- synthetic silicates, such as aluminum silicate and alkaline earth metal silicate like magnesium silicate or calcium silicate, with BET specific surface areas in the range of from 20 to 400 m$^2$/g and primary particle diameters in the range of from 10 to 400 nm;
- natural silicates, such as kaolin and other naturally occurring silica;
- glass fibers and glass fiber products (matting, extrudates) or glass microspheres;
- metal oxides, such as zinc oxide, calcium oxide, magnesium oxide and aluminum oxide;
- metal carbonates, such as magnesium carbonate, calcium carbonate and zinc carbonate;
- metal hydroxides, e.g. aluminum hydroxide and magnesium hydroxide;
- carbon blacks; the carbon blacks to be used here are prepared by the lamp black, furnace black or gas black process and have preferably BET (DIN 66 131) specific surface areas in the range of from 20 to 200 m$^2$/g, e.g. SAF, ISAF, HAF, FEF or GPF carbon blacks;
- rubber gels, such as those based on polybutadiene, butadiene/styrene copolymers, butadiene/acrylonitrile copolymers and polychloroprene;
- or mixtures thereof.

Examples of preferred mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the rubber. For many purposes, the preferred mineral is silica, such as silica made by carbon dioxide precipitation of sodium silicate. Dried amorphous silica particles suitable for use in accordance with the present invention may have a mean agglomerate particle size in the range of from 1 to 100 microns, preferably between 10 and 50 microns and most preferably between 10 and 25 microns. It is preferred that less than 10 percent by volume of the agglomerate particles are below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the trademarks HiSil® 210, HiSil® 233 and HiSil® 243 from PPG Industries Inc. Also suitable are Vulkasil® S and Vulkasil® N, from Bayer AG.

Often, use of carbon black as a filler is advantageous. Usually, carbon black is present in the polymer composite in an amount of in the range of from 20 to 200 parts by weight, preferably 30 to 150 parts by weight, more preferably 40 to 100 parts by weight. Further, it might be advantageous to use a combination of carbon black and mineral filler in the inventive polymer composite. In this combination the ratio of mineral fillers to carbon black is usually in the range of from 0.05 to 20, preferably 0.1 to 10.

The polymer composite furthermore optionally contains one or more cross-linking agents or curing systems. The present invention is not limited to a special curing system, however, peroxide curing system are preferred. Furthermore, the present invention is not limited to a special peroxide curing system. For example, inorganic or organic peroxides are suitable. Preferred are organic peroxides such as dialkylperoxides, ketalperoxides, aralkylperoxides, peroxide ethers, peroxide esters, such as di-tert.-butylperoxide, bis-(tert.-butylperoxyiso-propyl)-benzene, dicumylperoxide, 2,5-dimethyl-2,5-di(tert.-butylperoxy)-hexane, 2,5-dimethyl-2,5-di(tert.-butylperoxy)-hexene-(3), 1,1-bis-(tert.-butylperoxy)-3,3,5-trimethyl-cyclohexane, benzoylperoxide, tert.-butylcumylperoxide and tert.-butylperbenzoate. Usually the amount of peroxide in the polymer composite is in the range of from 1 to 10 phr (=per hundred rubber), preferably from 4 to 8 phr. Subsequent curing is usually performed at a temperature in the range of from 100 to 200° C., preferably 130 to 180° C. Peroxides might be applied advantageously in a polymer-bound form. Suitable systems are commercially available, such as Polydispersion T(VC) D-40 P from Rhein Chemie Rheinau GmbH, D (=polymer-bound di-tert.-butylperoxy-isopropylbenzene).

The rubber composition according to the present invention can contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are e.g. from 0.1 to 50 wt. %, based on rubber. Preferably the composition contains in the range of 0.1 to 20 phr of an organic fatty acid as an auxiliary product, preferably a unsaturated fatty acid having one, two or more carbon double bonds in the molecule which more preferably includes 10% by weight or more of a conjugated diene acid having at least one conjugated carbon-carbon double bond in its molecule. Preferably those fatty acids have in the range of from 8-22 carbon atoms, more preferably 12-18. Examples include stearic acid, palmitic acid and oleic acid and their calcium-, zinc-, magnesium-, potassium- and ammonium salts. Preferably the composition contains in the range of 5 to 50 phr of an acrylate as an auxiliary product. Suitable acrylates are known from EP-A1-0 319 320, for example p. 3, I. 16 to 35, from U.S. Pat. No. 5,208,294, in particular Col. 2, I. 25 to 40, and from U.S. Pat. No. 4,983,678, for example Col. 2, I. 45 to 62. Preference is made to zinc acrylate, zinc diacrylate or zinc dimethacrylate or a liquid acrylate, such as trimethylolpropanetrimethacrylate (TRIM), butanedioldimethacrylate (BDMA) and ethylenglycoldimethacrylate (EDMA). It might be advantageous to use a combination of different acrylates and/or metal salts thereof. Of particular advantage is often to use metal acrylates in combination with a Scorchretarder such as sterically hindered phenols (e.g. methyl-substituted aminoalkylphenols, in particular 2,6-di-tert.-butyl-4-dimethylaminomethylphenol).

The ingredients of the final polymer composite are mixed together, suitably at an elevated temperature that may range from 25° C. to 200° C. Normally the mixing time does not exceed one hour and a time in the range from 2 to 30 minutes is usually adequate. The mixing is suitably carried out in an internal mixer such as a Banbury mixer, or a Haake or Brabender miniature internal mixer. A two roll mill mixer also provides a good dispersion of the additives within the elastomer. An extruder also provides good mixing, and permits shorter mixing times. It is possible to carry out the mixing in two or more stages, and the mixing can be done in different apparatus, for example one stage in an internal mixer and one stage in an extruder. However, it should be taken care that no unwanted pre-crosslinking (=scorch) occurs during the mixing stage. For compounding and vulcanization see also: Encyclopedia of Polymer Science and Engineering, Vol. 4, p. 66 et seq. (Compounding) and Vol. 17, p. 666 et seq. (Vulcanization).

Due to the low viscosity of the polymer composite, the polymer composite is ideally suited to be processed by but not limited to molding injection technology. The polymer composite can also be useful to transfer molding, to compression molding, or to liquid injection molding. The polymer composite comprising a cross-linking system is usually introduced in a conventional injection molding and injected into hot (about 160-230° C.) forms where the cross-linking/vulcanization takes place depending on the polymer composite composition and temperature of the mold.

The inventive polymer composite is very well suited for the manufacture of a shaped article, such as a seal, hose, bearing pad, stator, well head seal, valve plate, cable sheathing, wheel, roller, pipe seal, in place gaskets or footwear component prepared by injection molding technology.

EXAMPLES

Examples 1-2

Tris(triphenylphosphine)Rhodium Chloride (Wilkinson's hydrogenation catalyst), 1,3-bis-(2,4,6-trimethylphenyl)-2-imidazoli-dinylidene)(tricyclohexylphosphine)-Ruthenium (phenylmethylene) dichloride (Grubbs $2^{nd}$ generation metathesis catalyst). Triphenyl-phosphine (TPP) and monochlorobenzene (MCB) were purchased from JMI, Materia Inc., Elf Atochem and PPG respectively and used as received.

Metathesis

The metathesis reactions were carried out in a 1L glass bottle under the following conditions:

| | |
|---|---|
| Cement Concentration<br>Bottles were shaken on<br>an industrial shaker | 6 wt. % |
| Reaction Temperature | see Table A |
| Catalyst Loading (Grubb's) | see Table A |
| Solvent | Monochlorobenzene |
| Substrate | Ex. 1: statistical Butadiene-acrylonitrile copolymer with a acrylonitrile content of 34 wt % and a Mooney-Viscosity ML (1 + 4) @ 100 deg. C. of 29 units.<br>Ex. 2: statistical Butadiene-acrylonitrile terpolymer with an acrylonitrile content of 21 wt % and a butylacrylate content of 32 wt % and a Mooney-Viscosity ML (1 + 4) @ 100 deg. C. of 29 units. |

To the glass bottle containing a 6% cement solution was added 15 mL of a monochlorobenzene solution containing Grubbs $2^{nd}$ generation catalyst. The bottle was then purged with Nitrogen, capped and shaken for 24 hrs under ambient conditions.

Hydrogenation

The hydrogenation reactions were carried out under the following conditions:

| | |
|---|---|
| Cement solid concentration | 6% |
| H$_2$(g) pressure | 1200 psi |
| Agitator Speed | 600 rpm |
| Reactor Temperature | 138° C. |
| Catalyst Loading (Wilkinson's) | 0.08 phr |
| Triphenylphosphine | 1 phr |
| Solvent | Monochlorobenzene |

The cement from the metathesis reaction was degassed 3 times with H$_2$ (100 psi) under full agitation. The temperature of the reactor was raised to 130° C. and a 60 mL monochlorobenzene solution containing Wilkinson's catalyst and triphenylphosphine was added to the reactor. The temperature was allowed to increase to 138° C. and maintained constant for the duration of the reaction. The hydrogenation reaction was monitored by measuring the residual double bond (RDB) level at various intervals using IR spectroscopy.

Alternatively, the Ruthenium metathesis catalyst could be used to hydrogenate the polymer. In such an in situ process the metathesis catalyst, upon treatment with hydrogen, is converted to a compound which can act as a hydrogenation catalyst.

Example 1

Details 75 g of substrate 1 (copolymer) was dissolved in 1175 g of MCB (6 wt.-% solid). The cement was then purged with dry Nitrogen. Further experimental details are listed in Table 1.

Example 2

Details 75 g of substrate 2 (terpolymer) was dissolved in 1175 g of MCB (6 wt.-% solid). The cement was then purged with dry nitrogen. Further experimental details are listed in Table 1.

TABLE A

Experimental Details

|  | Example 1 | Example 2 |
|---|---|---|
| cement conc. | 6% | 6% |
| reaction temp. | 25° C. | 25° C. |
| catalyst load | 0.05 phr | 0.05 phr |

TABLE 1

Summary of Raw NBR Polymer Properties

|  | NBR copolymer | NBR terpolymer | Product of Ex. 1* | Product of Ex. 2* |
|---|---|---|---|---|
| Grubbs Loading | N/A | N/A | 0.025 | 0.005 |
| ML (1 + 4 @ 100°C.) | 28 | 27 | 19 | 13 |
| Viscosity (cP) | 38 | 136 | 20 | 30 |
| Mn | 77000 | 50000 | 75000 | 47000 |
| Mw | 253000 | 308000 | 185000 | 119000 |
| PDI | 3.3 | 4.1 | 2.4 | 2.5 |

*before hydrogenation

TABLE 2

Summary of Raw HNBR Polymer Properties

|  | Product of Example 1 after hydrogenation | Therban ® A3406 as comparison |
|---|---|---|
| ML (1 + 4 @ 100° C.) | 43 | 60 |
| Mn | 74000 | 101000 |
| Mw | 187000 | 284000 |
| PDI | 2.5 | 2.8 |
| RDB (by IR) | <0.9% | <0.9% |

Examples 3-4

Compounding and physical testing in Peroxide Recipe

Polymer composites were mixed on an open mill. The curatives were added on a cold open mill in a separate mixing step. The formulations used in this assessment are based on a simplified peroxide recipe.

Carbon black N 660 Sterling-V available from Cabot Tire Blacks

Maglite® D is a MgO available from C. P. Hall.

Naugard® 445 is a diphenylamine available from Uniroyal Chemical.

Plasthall TOTM is a Trioctyl trimellitate available from C. P. Hall.

Vulkanox® ZMB-2/C5 is a Zinc salt of 4- and 5-methylmercapto benzimidazole available from Bayer AG DIAK #7 is a Triallylisocyanurate available from DuPont Dow Elastomers Vulcup 40KE is 2,2'-bis (tert-butylperoxy di-isopropylbenzene) available from Harwick Standard.

TABLE 3

Peroxid Cure Compounding Recipe

|  | Example 3 | Example 4 |
|---|---|---|
| Therban ® A3406 for comparison |  | 100 |
| Product of Example 1 after hydrogenation | 100 |  |
| Carbon Black, N660 Sterling-V | 50 | 50 |
| Maglite ® D | 3 | 3 |
| Naugard ® 445 | 1 | 1 |
| Vulkanox ® ZMB-2/C5 (ZMMBI) | 0.4 | 0.4 |
| Zinc Oxide (Kadox ® 920) Grade PC 216 | 3 | 3 |
| Diak #7 | 1.5 | 1.5 |
| Vulcup 40KE | 7.5 | 7.5 |

Polymer Composites Properties

Table 4 shows a summary of the properties of polymer composites of Exp. 3 and 4. Example 4 is for comparison. The MDR cure characteristics were at 1.7 Hz, 1° arc, 180° C., 30 min, 100 dNm.

TABLE 4

Summary of Polymer Composite Properties

|  | Example 3 | Example 4 |
|---|---|---|
| Mooney (ML 1 + 4 @ 100° C.) |  |  |
| Raw Polymer | 43 | 60 |
| Polymer composite | 74 | 94 |
| MH (dN · m) | 49.9 | 53.5 |
| ML (dN · m) | 1.9 | 3.1 |
| Delta Torque: MH − ML (dN · m) | 48.1 | 50.4 |
| 100% Modulus (Mpa) | 7.7 | 8.4 |
| Hardness Shore A | 68 | 67 |
| Ultimate Tensile (Mpa) | 24.2 | 25.9 |
| Elongation at Break (%) | 248 | 233 |
| Compression Set in % after 70 h @ 150° C. | 21.4 | 21.3 |

From Table 4, it is clear that although the molecular weight (Mw) of the Low Mooney HNBR used in polymer composite 3 is only 66% of that of Therban® A3406, the physical properties remain very good.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a, optionally hydrogenated, nitrile rubber comprising the steps of
   a) reacting a nitrile rubber in the absence of any co-olefin and in the presence of at least one compound selected from the group consisting of compounds of the general formulas I, II, III or IV, Formula I

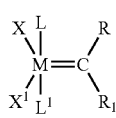

wherein:

M is Os or Ru,

R and R$^1$ are, independently, hydrogen or a hydrocarbon selected from the group consisting of C$_2$-C$_{20}$ alkenyl, C$_2$-C$_{20}$ alkynyl, C$_1$-C$_{20}$ alkyl, aryl, C$_1$-C$_{20}$ carboxylate, C$_1$-C$_{20}$ alkoxy, C$_2$-C$_{20}$ alkenyloxy, C$_2$-C$_{20}$ alkynyloxy, aryloxy, C$_2$-C$_{20}$ alkoxycarbonyl, C$_1$-C$_{20}$ alkylthio, C$_1$-C$_{20}$ alkylsulfonyl and C$_1$-C$_{20}$ alkylsulfinyl, X and X$^1$ are independently any anionic ligand, L and L$^1$ are, independently any neutral ligand, optionally, L and L$^1$ can be linked to one another to from a bidentate neutral ligand;

Formula II

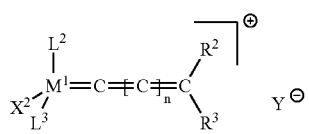

wherein:

M$^1$ is Os or Ru;

R$^2$ and R$^3$ are, independently, hydrogen or a hydrocarbon selected from the group consisting of C$_2$-C$_{20}$ alkenyl, C$_2$-C$_{20}$ alkynyl, C$_1$-C$_{20}$ alkyl, aryl, C$_1$-C$_{20}$ carboxylate, C$_1$-C$_{20}$ alkoxy, C$_2$-C$_{20}$ alkenyloxy, C$_2$-C$_{20}$ alkynyloxy, aryloxy, C$_2$-C$_{20}$ alkoxycarbonyl, C$_1$-C$_{20}$ alkylthio, C$_1$-C$_{20}$ alkylsulfonyl and C$_1$-C$_{20}$ alkylsulfinyl, X$^2$ is a anionic ligand, and L$^2$ is a neutral mono- or polycyclic π-bonded ligand, L$^3$ is a ligand selected from the group consisting of phosphines, sulfonated phosphines, fluorinated phosphines, functionalized phosphines bearing up to three aminoalkyl-, ammoniumalkyl-, alkoxyalkyl-, alkoxylcarbonylalkyl-, hydrocycarbonylalkyl-, hydroxyalkyl- or ketoalkyl-groups, phosphites, phosphinites, phosphonites, phosphinamines, arsines, stibenes, ethers, amines, amides, imines, sulfoxides, thioethers and pyridines, Y$^-$ is a non-coordinating anion, n is an integer in the range of from 0 to 5, Formula III

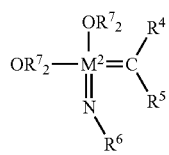

wherein

M$^2$ is Mo or W,

R$^4$, R$^5$ are, independently, hydrogen or a hydrocarbon selected from the group consisting of C$_2$-C$_{20}$ alkenyl, C$_2$-C$_{20}$ alkynyl, C$_1$-C$_{20}$ alkyl, aryl, C$_1$-C$_{20}$ carboxylate, C$_1$-C$_{20}$ alkoxy, C$_2$-C$_{20}$ alkenyloxy, C$_2$-C$_{20}$ alkynyloxy, aryloxy, C$_2$-C$_{20}$ alkoxycarbonyl, C$_1$-C$_{20}$ alkylthio, C$_1$-C$_{20}$ alkylsulfonyl and C$_1$-C$_{20}$ alkylsulfinyl;

R$^6$ and R$^7$ are independently selected from any unsubstituted or halo-substituted alkyl, aryl, aralkyl groups or silicon-containing analogs thereof, Formula IV

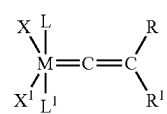

wherein

M is Os or Ru,

R and R$^1$ are independently selected from the group consisting of hydrogen, substituted or unsubstituted alkyl, and substituted or unsubstituted alkyl X and X$^1$ are independently any anionic ligand, and L an L$^1$ are independently any neutral ligand;

and optionally b) hydrogenating the product of step a).

2. A process according to claim 1 wherein the hydrogenation is performed under homogeneous catalytic conditions.

3. A process according to claim 2 wherein the homogeneous catalytic reduction is carried out in situ without first isolating the product of step a).

4. A process according to claim 1 wherein no further hydrogenation catalyst is added before or during step b).

5. A process according to claim 1, wherein the metathesis catalyst is a compound of Formula I wherein L and L$^1$ are independently selected from the group consisting of trialkylphosphines, imidazolidinylidenes or imidazolidines.

6. A process according to claim 5 wherein either L or L$^1$ is a trialkylphosphine and the remaining ligand is a imidazolidinylidenes, X and X$^1$ are chloride ions and M is ruthenium.

7. A process according to claim 6 wherein the ratio of compound to nitrile rubber is in the range of from 0.005 to 5.

8. A process according to claim 7, wherein the process is carried out in an inert solvent selected from the group consisting of monochlorobenzene, dichloromethane, benzene, toluene, tetrahydrofuran and cyclohexane.

9. A process according to claim 1, wherein the hydrogenation is carried out using a catalyst of formula:

$(R^8{}_mB)_lRhX^3{}_n$ wherein each R$^8$ is independently selected from the group consisting of a C$_1$-C$_8$-alkyl group, a C$_4$-C$_8$-cycloalkyl group, a C$_6$-C$_{15}$-aryl group and a C$_7$-C$_{15}$-aralkyl group;

B is selected from the group consisting of phosphorus, arsenic, sulfur, and a sulphoxide group (S=0);

X$^3$ is selected from the group consisting of hydrogen and an anion; and l is 2, 3 or 4, m is 2 or 3 and n is 1, 2 or 3.

10. A process according to claim 9 wherein the hydrogenation catalyst is (PPh$_3$)$_3$RhCl.

11. An, optionally hydrogenated, nitrile rubber having a molecular weight (M$_w$) in the range of from 20,000 to 250,000, a Mooney viscosity (ML 1+4 @ 100 deg. C.) of in the range of from 1 to 50, and a MWD (or polydispersity index) of less than 2.5.

12. A polymer composite comprising at least one, optionally hydrogenated, nitrile rubber polymer having a Mooney viscosity (ML 1+4 @ 100° C.) in the range of from 50-30, at least one filler and optionally at least one cross-linking agent.

13. A polymer composite according to claim 11 wherein the raw polymer Mooney viscosity (ML 1+4 @ 100° C.) is below 50.

14. A polymer composite according to claim 12 wherein the polymer composite further comprises a peroxide system.

15. A process for preparing a polymer composite according to claim 12 comprising reacting at least one, optionally hydrogenated, nitrile rubber polymer having a Mooney viscosity (ML 1+4 @ 100° C.) in the range of from 50-30, at least one filler and optionally at least one cross-linking agent.

16. A process for the manufacture of a shaped article comprising the step of injection molding a polymer composite comprising at least one, optionally hydrogenated, nitrile rubber polymer having a Mooney viscosity (ML 1+4 @ 100° C.) in the range of from 50-30, at least one filler and at least one cross-linking agent.

17. A process according to claim 16, wherein the shaped article is seal, hose, bearing pad, stator, well head seal, valve plate, cable sheathing, wheel, roller, in place gaskets or pipe seal.

* * * * *